April 15, 1947.   C. B. BAVER   2,418,815
FLUID HEATING
Filed March 20, 1942   6 Sheets-Sheet 1

Fig. 1

INVENTOR.
Clyde B. Baver
BY
ATTORNEY

April 15, 1947.                    C. B. BAVER                    2,418,815
                                  FLUID HEATING
                    Filed March 20, 1942          6 Sheets-Sheet 2

INVENTOR.
Clyde B. Baver
BY Joseph P. Moran
ATTORNEY

April 15, 1947. C. B. BAVER 2,418,815
FLUID HEATING
Filed March 20, 1942 6 Sheets-Sheet 3

INVENTOR.
Clyde B. Baver
BY Joseph Moran
ATTORNEY

Fig 7

April 15, 1947.    C. B. BAVER    2,418,815
FLUID HEATING
Filed March 20, 1942    6 Sheets-Sheet 5

Fig. 8

INVENTOR.
Clyde B. Baver
BY Joseph P. Moran
ATTORNEY

April 15, 1947.  C. B. BAVER  2,418,815
FLUID HEATING
Filed March 20, 1942  6 Sheets-Sheet 6

Fig. 9

INVENTOR.
Clyde B. Baver
BY
ATTORNEY

Patented Apr. 15, 1947

2,418,815

UNITED STATES PATENT OFFICE 2,418,815

FLUID HEATING

Clyde B. Baver, Fanwood, N. J., assignor to The Babcock & Wilcox Company, Newark, N. J., a corporation of New Jersey Application March 20, 1942, Serial No. 435,466

11 Claims. (Cl. 122—1)

The invention disclosed herein relates to heat exchange apparatus utilizing gaseous products of combustion as the heating medium. The invention also embraces methods whereby heating gases of different characteristics may be utilized selectively to obtain effective heat transfer at relatively high efficiencies under varying conditions.

The invention is particularly applicable to direct-fired boiler units wherein the hot heating gases are derived from the combustion of fuel in an associated furnace, and wherein the total fluid heating surface is distributed between a plurality of components or sections, including for example a vapor generating section, an economizer section for heating feed water or other liquid from which vapor is to be generated, and a supplementary fluid heating section for heating combustion air.

In the usual arrangement of boiler unit it has been customary to direct the flow of heating gases from the furnace over the convection heated sections of the unit in series, and with such an arrangement adapted to operate efficiently with a fuel having characteristics giving high weights of combustion gases per unit of heat liberation, it has been necessary to sacrifice efficiency when firing with a fuel of comparatively low gas weights since the lower mass flow seriously affects the rate of heat absorption. The alternative to this would have been to accept a compromise between the performances of the different fuels without realizing with any of the fuels the maximum efficiency which could have been derived from operation at all times with a single type of fuel.

A specific illustration is in the case of a boiler unit fired at one time by blast furnace gas, having a low calorific value, and at another time by some other fuel such as pulverized coal, or oil, having a comparatively high calorific value, where calorific value, as hereafter used for the purpose of this disclosure, is in terms of the B. t. u. liberation of the specific fuel per unit of weight of the resultant gaseous products of combustion. In such a case, in order to provide the same output of vapor when operating with blast furnace gas as with pulverized coal or oil, the extent and arrangement of the heat transfer surface has been determined from characteristics of the fuel of lower calorific value, due to the extremely high weight of heating gas flow required for the desired maximum capacity of the unit, and the consequent high draft loss through the economizer and air heating sections which determines their sizes and proportions. When the shift is made to a fuel of higher calorific value, the weight of the heating gases required for the same output is considerably less so that the accompanying draft loss through the unit becomes extremely low, with the proportions of the heating sections fixed, as is customary, and although the heating sections contain a generous amount of heat transfer surface, it is not being utilized effectively due to low gas velocities and corresponding low mass flow.

When fuels are burned with customary proportions of excess air to give proper combustion as afforded by fuel burners now in use, the weight of the gaseous products of combustion resulting from different fuels may vary widely, for a given value of heat liberation, due in part to the fact that certain fuels, particularly a gaseous fuel such as blast furnace gas, contain constituents such as nitrogen which contribute little or nothing to the calorific value of the fuels but rather reduce the ultimate temperatures of the combustion gases.

The relative heating characteristics of a selected variety of fuels commonly used are indicated by the combustion gas weights under perfect combustion conditions for a heat liberation of 10,000 B. t. u., as follows:

| | Weight of combustion gases, lbs. per 10,000 B. t. u. |
|---|---|
| Blast furnace gas | 15.4 |
| Pulverized coal | 10.2 |
| Oil | 9.2 |

The wide variation in heating gas weights for these same fuels, is indicated by the following specimen tabulation based on an output capacity for a particular boiler unit of about 150,000 pounds of steam per hour:

| | Weight of heating gases (gaseous products of combustion), lbs./hr. |
|---|---|
| With blast furnace gas | 334,500 |
| With pulverized coal | 200,000 |
| With oil | 180,000 |

It may be concluded therefore, that when blast furnace gas is burned to give the same resultant absorption in a boiler unit, the resultant products of combustion will be much higher in weight than with richer fuels such as oil or pulverized coal.

When the weight of products of combustion per unit of heat liberation is high, as for example in the case of blast furnace gas, the quantity of gas determines the characteristics of the draft apparatus such as the induced draft fan and stack. If the same furnace and heat absorbing equipment such as boiler, economizer, and air heater is to be fired at times with a second type of fuel having characteristics such that the quantity of products of combustion per unit of heat liberation will be materially lower, as for example oil, then the draft loss will be very materially lower as will the mass flow with reference to the tubes or heating surfaces, with lower efficiency of heat absorption resulting.

Thus, if the tube spacing and fan are selected for blast furnace gas only, the operation of the same equipment fired by oil will be uneconomical because of low rates of heat transfer to heating surface because of low mass flow. On the other hand if the apparatus is selected for good heat absorption on the basis of the higher grade fuel such as oil, the fan would be inadequate to handle the greater quantity of gases with the lower grade fuel for generating the same quantity of steam.

A large proportion of the total draft loss of a modern boiler unit results from the gas flow resistance of the feed water heating economizer or the air preheater, which are placed beyond the boiler section and act to reduce the temperature of the gases below the saturated temperature of the boiler water. Accordingly, I divide and arrange the heating surface involved in the economizer or air heater, or both, and provide for alternate gas flow paths therethrough, so that the maximum draft loss or flow resistance may be kept within predetermined limits even though the gaseous products of combustion may vary widely, as for example to the extent of from 58,000 pounds per hour when operating with a high grade fuel at a low rating of the boiler unit to 334,500 pounds per hour when operating at a high rating with a low grade fuel. With gas weights varying to the extent indicated, in a ratio of approximately 1:5.70, the corresponding variation in draft loss is in greater ratio, substantially in proportion to the squares of the weights, and accordingly presents a serious limitation to the operation of the unit.

For an assumed maximum load condition of about 150,000 lbs./hr. the weights of the heating gases might vary from about 197,500 lbs./hr. using a high grade fuel, to about 334,500 lbs./hr. using a lower grade fuel, the weight ratio being about 1:1.80, and the resulting draft loss ratio about 1:3.50.

It is a purpose of the invention therefore to obviate such wide variations in draft resistances, and still make it possible to attain full load operation if desired at reasonably high efficiencies.

Another object of the invention is to arrange the fluid heating sections of a vapor producing unit so that the heating surfaces of such sections are utilized to best advantage over a range of varying heating gas weight conditions; for example, when fuels of different heating characteristics are used at different times to provide a given output capacity, or when the same fuel is used continuously at varying rates to provide varying output capacities.

A further object of the invention is to provide an arrangement of apparatus for the recovery of heat from the heating gases leaving a steam boiler whereby wide variations in the total weight of such gases resulting from the burning of different fuels may be utilized with good efficiency of heat absorption and with an induced draft installation economical both from the standpoint of installation and operating cost.

A more specific object of the invention involves the control of heating gas flow through one or more of the fluid heating sections, particularly through the economizer or air heater, or both, in order to maintain a relatively low draft loss condition when a change-over is made to a fuel of lower heating characteristics requiring a higher weight of heating gas for the required heat transfer.

These and other objects of the invention are more fully set forth in the description which follows, together with various features of the selected embodiments as illustrated in the accompanying drawings, in which.

Figure 1:
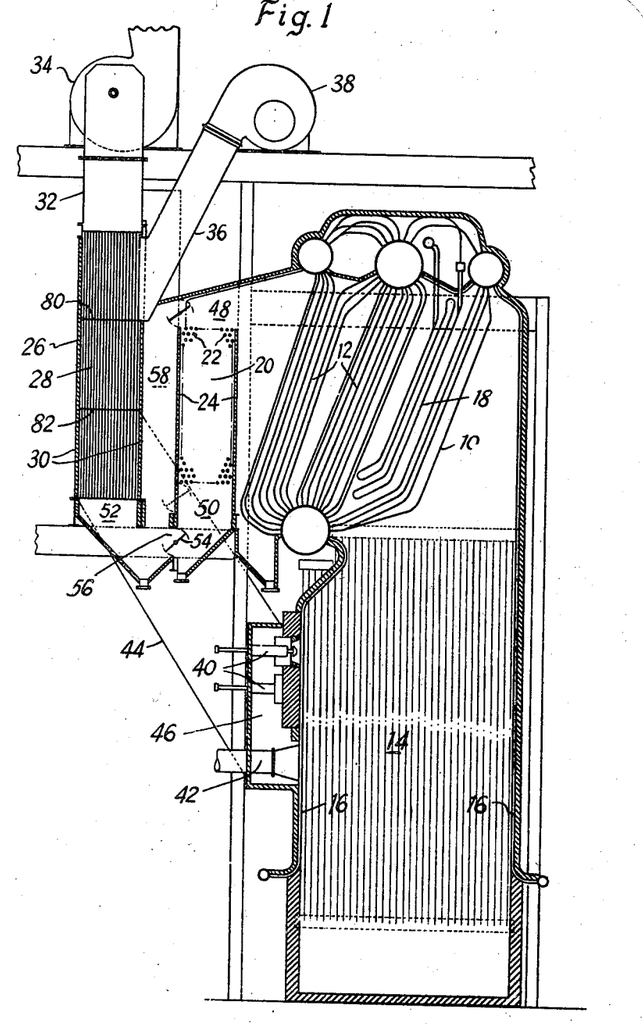
Fig. 1 is a side elevation, in section, of a boiler unit illustrating an embodiment of the invention.

In detail, according to Fig. 1, the boiler unit includes a vapor generating section 10 having its tubular heating surface 12 disposed across the outlet from a furnace 14 for absorption of heat from hot heating gases resulting from the combustion of fuel in the furnace. The vapor generating section 10 may also include groups of furnace wall cooling tubes 16, and a superheater 18 may be provided for superheating the total vapor output.

Rearward of the boiler heating surface 12 with respect to gas flow from the furnace is an economizer 20 having spaced tubes 22 for the feed water or other liquid extending across the gas flue 24, and an air heater 26 having spaced tubes 28 for the heating gas extending longitudinally of the air casing 30. The cooled heating gases upon leaving the air heater 26 are discharged through a gas outlet duct 32 under the influence of the induced draft fan 34 to a stack (not shown). The air to be heated for combustion purposes is supplied to the air heater through duct 36 under pressure from the forced draft fan 38.

The furnace 14 in this instance is provided with oil burners 40 suitably arranged in rows at different levels as indicated, and burners 42 for burning blast furnace gas arranged in a row at an adjacent level. It is contemplated that ordinarily such sets of burners will be operated separately for burning only one kind of fuel at a time, but it is within the scope of this invention to operate the sets of burners jointly for burning different fuels simultaneously, if desired. A condition is also contemplated where it might not always be necessary to employ different burners for fuels of different characteristics, for example, in the case of certain gaseous fuels, in which case a single burner or set of burners could be used at one time for one fuel and at another time for another fuel. Hot air for supporting combustion is supplied to burners 40 or 42, depending on which set of burners is in operation for the kind of fuel being used, the hot combustion air being supplied from the air heater 26 through ducts 44 connected to opposite ends of the windbox 46.

When burners 42 are shut off, and burners 40 are in operation, for burning oil for example, of relatively high calorific value, the gaseous products of combustion are relatively low in weight so that all of the heating gas may be directed through the various heating surface sections in series with only a nominal draft loss resulting. However, when burners 40 are shut off, and burners 42 are in operation, for burning blast furnace gas for example, of relatively low calorific value, the weight of the heating gases is considerably increased, for an equivalent normal load or vapor output capacity; the increase in weight amounting to possibly as much as 85%, in which case, for serial flow of all gas through all sections, the resultant draft loss through the economizer and air heater sections combined might be increased as much as 275%; the percentages cited varying with different installations but indicating the general trend.

Figure 2:
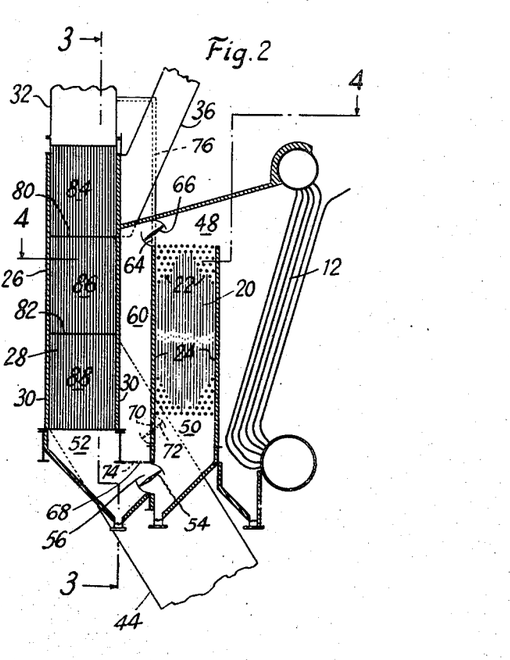
Fig. 2 is an enlarged sectional view showing a fragment of Fig. 1.
Figure 3:
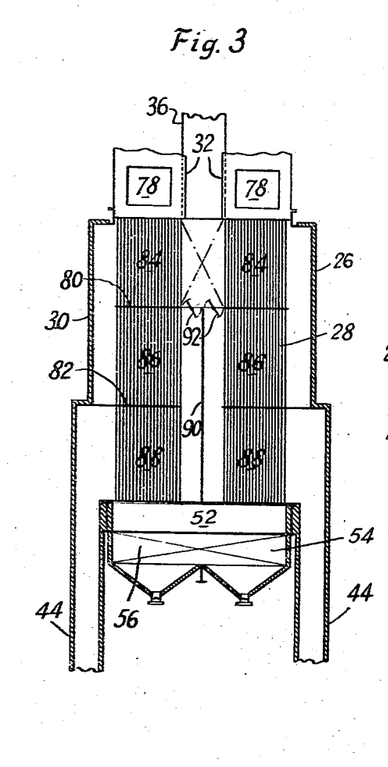
Figs. 3 and 4 are sectional side and plan views respectively, taken along lines 3—3 and 4—4 of Fig. 2.
Figure 4:
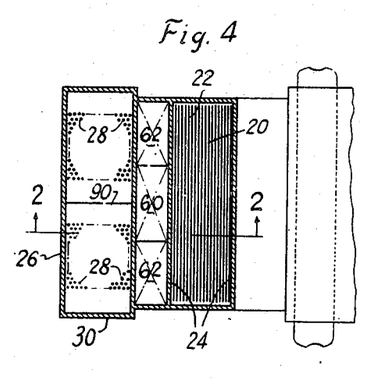

Figs. 2, 3, and 4 show in detail a particular arrangement of economizer and air heater for suitably proportioning the flow of heating gases over these sections whereby the operating efficiencies of the unit may be maintained as high as possible under varying weight and temperature conditions of the heating gases, due to the use of a single fuel or combination of fuels at varying output capacities, or to the use of different fuels at different times. After the heating gas has completed its course through the boiler section 10 and has arrived at the space 48 beyond the boiler tubes 12, all of the gas may flow in series through both the economizer and air heater, or the flow may be proportioned between these sections, or otherwise variously modified, as will be made more apparent as the description proceeds. The flow of gas from the space 50 below the economizer to the space 52 below the air heater may be regulated by means of the damper 54 which is movable across the connecting passageway 56, this damper being opened to permit gas to flow in series through the economizer and air heater. A flue 58 intermediate the economizer and air heater is divided longitudinally to form a central downflow passage 60 for bypassing heating gases around the economizer 20, and two outer upflow passages 62, 62, for bypassing heating gases from the space 50 around the air heater 26. The economizer bypass passage 60 has a side inlet opening 64 in which is positioned a movable damper 66 for admitting a regulable amount of gas from the space 48 above the economizer, the lower end 68 of the passage 60 being continuously open to the space 52 for discharging the bypassed heating gas to the gas inlet end of the air heater. The air heater bypass passages 62, 62 are each provided with a side inlet opening 70 fitted with a movable damper 72 for admitting a regulable amount of gas from the space 50 below the economizer, each passage 62 being closed at its extreme lower end 74, and each being extended upwardly in the form of a duct 76 having an outlet opening 78 for discharging the bypassed gas into the gas outlet duct or ducts 32 above the air heater and ahead of the induced draft fan 34.

The air heater casing 30 is divided transversely by baffles 80, 82 to provide three passes 84, 86, 88, for the air across the heating gas tubes 28, each pass being symmetrically divided to provide complementary portions at opposite sides of the central partition 90, the air entering through duct 36 and dividing to flow in parallel through the complementary portions of passes 84, 86, 88, and finally through the outlet ducts 44. Dampers 92, 92, at opposite sides of the partition 90 are provided for bypassing inlet air direct to the outlet pass 88 at the heating gas inlet end of the air heater.

Figure 5:
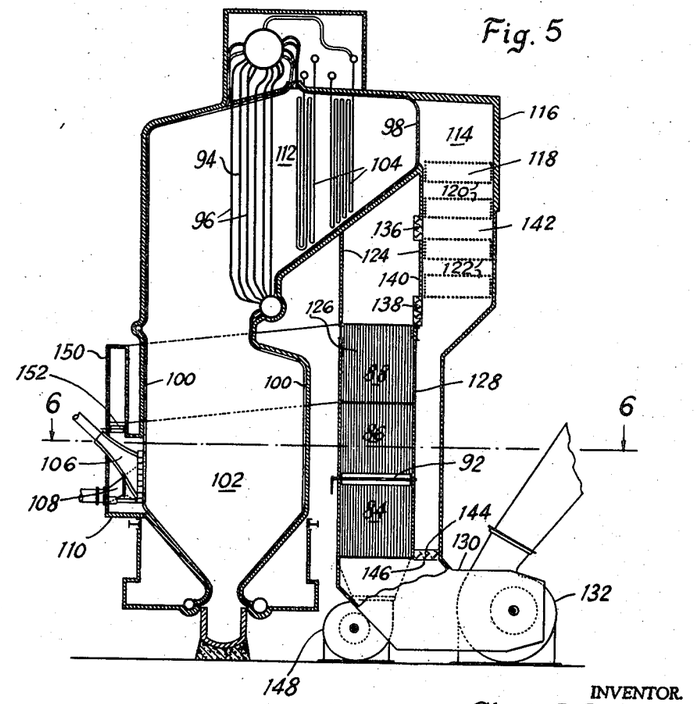
Figs. 5 and 6 are sectional side and plan views respectively of another embodiment, the latter being taken along line 6—6 of Fig. 5.
Figure 6:
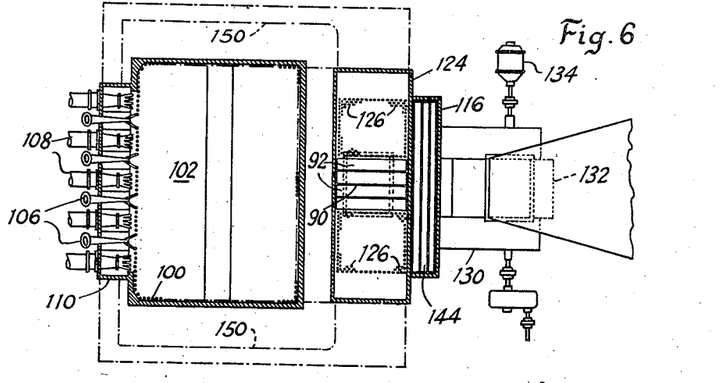

Figs. 5 and 6 show a direct-fired boiler unit having features similar to those incorporated in Figs. 1 to 4 but in modified arrangement. The unit includes a vapor-generating section 94 comprising the boiler tubes 96 and 98, and other tubes 100 associated with the walls of the furnace 102 at various locations. A tubular superheater in two sections is indicated at 104, the sections being connected externally if desired through a desuperheater (not shown). The furnace 102 may be fired at one time by pulverized coal delivered through burners 106 and at another time by blast furnace gas delivered through burners 108, or if desired, both fuels may be fired simultaneously in suitable proportions. Hot air is supplied in regulable amounts to the windbox 110 and thence to the burners 106 and 108, for supporting combustion of the fuel or fuels being used.

The hot gases of combustion are discharged from the furnace through an outlet passage 112 across the bank of boiler tubes 96, superheater sections 104, and across the row of boiler tubes 98, the gases then entering the gas space 114 at the upper end of the upright flue 116 in advance of the economizer 118, and from this point flowing downwardly over the economizer sections 120, 122, each section as shown being formed of spaced tubes in successive rows, a regulated proportion of the gases being admitted to an adjacent upright flue 124 for downward flow through the heating gas tubes 126 of the air heater 128. The cooled gases are discharged from the economizer flue 116 and air heater flue 124 into the outlet duct 130 under draft from the induced draft fan 132, driven by motor 134, for delivery to a stack (not shown).

The flow of heating gas from flue 116 into the flue 124 may be variously regulated by adjustment of one or both of the multiple plate dampers 136 and 138 located in the common wall 140 separating the flues, one damper 136 being positioned at the level of space 142 intermediate the economizer sections 120 and 122, and the other damper 138 being positioned at a level below the lower economizer section 122. An additional similar damper 144 is positioned across a lower portion of the economizer flue 116 for controlling the discharge of gas through the flue outlet 146 into the outlet duct 130.

With this arrangement of heating surfaces and dampers, all of the gas available at space 114 can be directed over both sections 120, 122 of the economizer in series, damper 136 being fully closed, and then in series through the air heater tubes 126, damper 138 being fully open, and damper 144 being fully closed. As a variation to suit certain conditions, with damper 136 open, and dampers 138 and 144 closed, the entire quantity of heating gas may be directed over economizer and air heater surface in series but with only a portion of the economizer surface included.

When parallel flow of heating gas over economizer and air heater surface is desired, the division of gas is made at the space 142 intermediate the economizer sections, since the upper section 120 is always in the path of the gases. From space 142 therefore, a portion of the gas which has traversed only a part of the economizer surface, section 120, may be diverted into the air heater flue 124, damper 136 being open, with the remainder of the gas continuing over the lower economizer section 122 and through the flue outlet 146, damper 138 being closed and damper 144 open. If desired, dampers 136 and 138 may both be opened to divert gases of different temperatures from the economizer flue 116 for combined flow through the air heater 128.

The air heater 128 as shown is essentially of the same arrangement as that described in connection with Figs. 1 to 4, except that the position of the air heater is reversed, that is, the combustion air from forced draft fan 148 is directed in parallel through the complementary portions of the air passes 84, 86, 88, at successively higher levels, instead of at successively lower levels, the heated air leaving the outlet pass 88 through ducts 150 leading to opposite ends of the windbox 110. A damper 152 in each duct may be provided to regulate the supply of heated air. Dampers 92, 92, as before, at opposite sides of the central partition 90 are provided to regulate the amount of inlet air bypassed to the outlet pass 88 at the heating gas inlet end of the air heater.

Figure 7:
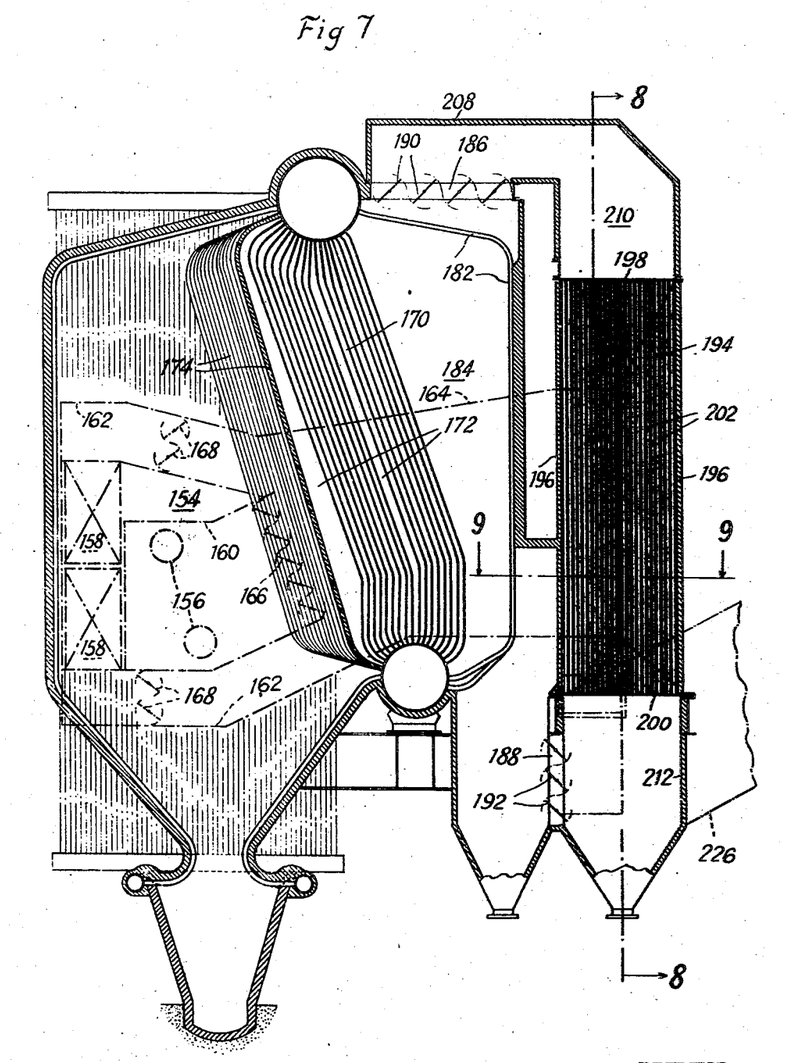
Fig. 7 is a side elevation, in section, of a further embodiment.
Figure 8:
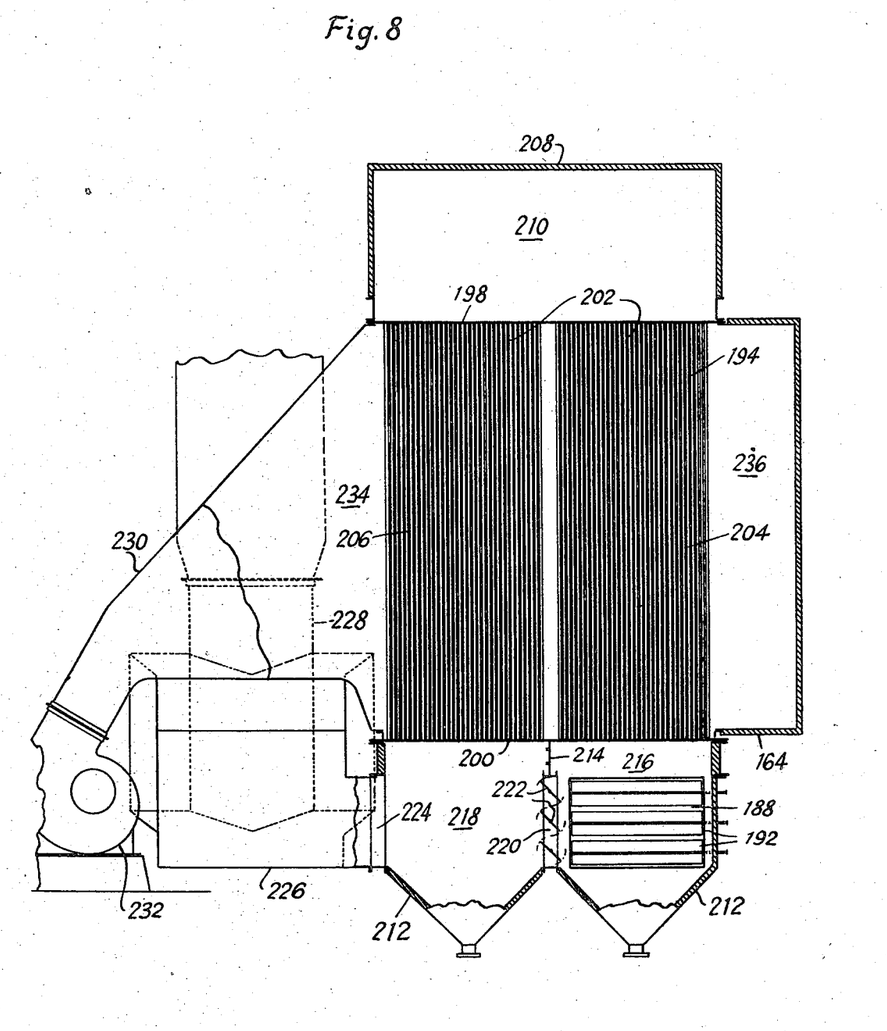
Figs. 8 and 9 are vertical and plan sections respectively of apparatus shown in Fig. 7, taken along lines 8—8 and 9—9.
Figure 9:
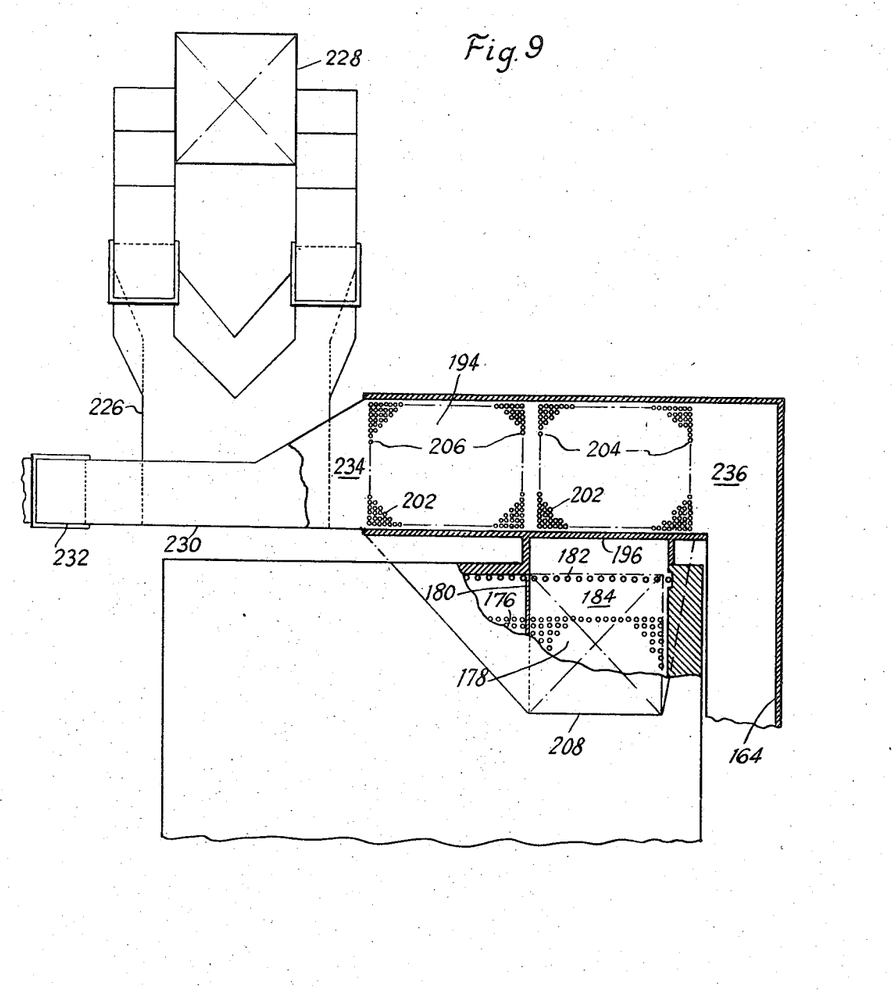

Figs. 7, 8 and 9 illustrate a further embodiment of the invention wherein a furnace 154 is similarly arranged for the combustion of different fuels simultaneously or at different times, ports 156 at two levels in a side wall of the furnace being indicated for burners utilizing pulverized coal, for example, and ports 158 for burners utilizing a gaseous fuel such as blast furnace gas. Hot combustion air is suitably supplied to these burner ports through branch duct 160 for burner ports 156, and branch ducts 162, 162, for burner ports 158, each duct being a branch of the main hot air supply duct 164, and the supply of air through each duct being separately regulated by dampers 166 and 168, respectively. The specific forms of burners utilized in each case may be of suitable known construction, and may be of such types as shown in Figs. 1 and 5.

The convection heated surfaces of the boiler unit shown include a vapor generating section 170 arranged relative to the flow of heating gases from the furnace essentially as disclosed in U. S. Patent 1,999,984, E. G. Bailey et al., the gases entering the tube bank space 172 from around one end of the longitudinal baffle 174. The flow of gases over the tubes of the bank is maintained substantially horizontal throughout a plurality of transverse passes, including passes 176 and 178 separated by baffle 180 as indicated in part in Fig. 9. As a modification of the patented disclosure, spaced boiler tubes 182 are provided arranged in a row spaced from the boiler tube bank 170. The heating gases discharged from the boiler pass 178 enter the space 184 at the rear of the bank and from there are discharged either through the gas outlet 186 in the roof of the setting or through the lower side wall gas outlet 188. Dampers 190 and 192 are included for regulating the flow of gases through the respective outlet openings.

A tubular air heater 194 located adjacent the furnace setting comprises an outer casing 196 having upper and lower tube sheets 198 and 200 at opposite ends to which vertically disposed heating gas tubes 202 are connected, the tubes being in two groups 204 and 206. A duct 208 having its inlet over the roof outlet 186 serves as a conductor for heating gases to the space 210 above the upper ends of the air heater tubes 202 when damper 190 is in an opened position. A hopper compartment 212 below the air heater tubes 202 is divided by a partition 214 to provide a space 216 below the group of tubes 204 and a space 218 below the group of tubes 206, the partition having an opening 220 therein in which damper 222 is located.

The air heater gas outlet is provided by an opening 224 at one end of the hopper compartment 212, the spent heating gases being discharged through the outlet opening and connecting duct 226 and through the induced draft fan 228 to a stack (not shown).

Combustion air is supplied to the air heater through inlet duct 230 under pressure from the forced draft fan 232, the air being directed horizontally across both groups of tubes 202 in a single pass from inlet 234 to outlet 236 where connection is made with the main hot air supply duct 164 previously mentioned.

Where the boiler unit is being fired with pulverized coal or oil, for example, the damper 190 across the roof outlet 186 may be closed, and the damper 192 across the lower outlet 188 opened, thus causing the heating gases to be discharged through lower outlet 188 into the compartment space 216. With the partition damper 222 closed, the gases may be caused to flow through the groups of air heater tubes 204 and 203 in series, all of the gases first flowing upwardly through the first group of tubes 204, turning in the space 210 above the groups, and flowing downwardly through the second group of tubes 206 into the compartment space 218, from whence the waste gases are discharged to the stack, as previously described.

When a fuel such as blast furnace gas is used for firing, requiring a substantially greater weight of combustion gases to flow through the unit, for a given vapor output, it is preferable to provide parallel flow through the two groups of air heater tubes in order to minimize draft losses. For this condition, the upper damper 190 is opened and the lower damper 192 closed, thereby causing the heating gases to be discharged direct to the space 210 above the air heater tubes 202. The flow of gases is then divided between the groups of tubes 204 and 206, one part flowing downwardly through tubes 204 to space 216 and another part flowing downwardly through tubes 206 to space 218 in parallel with the first part; the partition damper 222 being opened to provide an outlet for gas from space 216 whereby the total quantity may be discharged from space 218, as before, through the gas outlet 224.

While in accordance with the provisions of the statutes I have illustrated and described herein the best forms of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a fluid heater having a heating gas outlet, a pair of heat exchangers having heating surface therein, a conduit system connecting said heat exchangers to said gas outlet for a heating gas flow to said heat exchangers, dampers positioned in said conduit system and operable to provide a heating gas flow through both of said heat exchangers in series or in parallel or through only one of said heat exchangers, and means for by-passing the fluid to be heated in one of said heat exchangers around part of the heating surface therein, the heating surface contacted by said heating gas for any of said conditions of flow being confined to heating surface provided by said heat exchangers.

2. In a fluid heater having a heating gas outlet, a pair of laterally spaced heat exchangers, a main conduit connecting said heat exchangers and gas outlet for a gas flow through said heat exchangers, a bypass conduit arranged to connect the inlet end of one heat exchanger to the inlet end of the other heat exchanger, a second bypass conduit arranged to connect the outlet end of said one heat exchanger to the outlet end of said other heat exchanger, and dampers positioned in said main and bypass conduits and operable to provide a heating gas flow through both of said heat exchangers in series or in parallel or through either one of said heat exchangers only, said bypass conduits being partly defined by the adjacent sides of said heat exchangers.

3. In a fluid heater having a heating gas outlet, a pair of heat exchangers, a main conduit connecting said heat exchangers and gas outlet for a gas flow through said heat exchangers, a bypass conduit arranged to connect the inlet end of one heat exchanger to the inlet end of the other heat exchanger, a second bypass conduit arranged to connect the outlet end of said one heat exchanger to the outlet end of said other heat exchanger, dampers positioned in said main and bypass conduits and operable to provide a heating gas flow through both of said heat exchangers in series or in parallel, and means for bypassing the fluid to be heated in one of said heat exchangers around part of said heat exchanger.

4. In a fluid heater having a heating gas outlet, a pair of vertically spaced heat exchangers, a main conduit connecting said heat exchangers to said gas outlet, a bypass conduit arranged along one side of the lower heat exchanger to connect the outlet end of the upper heat exchanger to the outlet end of the lower heat exchanger, dampers positioned in said main and bypass conduits and operable to provide a heating gas flow through both of said heat exchangers in series or in parallel, and means for bypassing the fluid to be heated in said lower heat exchanger around part of said lower heat exchanger.

5. In a fluid heating unit having a pair of heat exchangers arranged to receive heating gases generated therein, the method of operation which comprises at low operating loads passing the heating gases generated through both of said heat exchangers in series, at high operating loads passing the heating gases generated through both of said heat exchangers in parallel, and during the operation of said unit bypassing a regulable portion of the fluid to be heated in one of said heat exchangers around part of the heating surface therein.

6. In a fluid heating unit having a pair of first and second heat exchangers arranged to receive heating gases generated therein, the method of operation which comprises at low operating loads passing the heating gases generated through said first and second heat exchangers in series in the sequence named, at high operating loads passing the heating gases generated through both of said heat exchangers in parallel, and at one of said loads bypassing a regulable portion of the fluid to be heated in said second heat exchanger around part of the heating surface therein.

7. In a steam generating unit having an economizer and an air heater connected to its gas outlet, the method of burning two fuels of different calorific values which comprises burning the higher calorific fuel and directing the gaseous products of combustion leaving the gas outlet through the economizer and the air heater in series in the sequence named, at other times burning the lower calorific fuel and directing the products of combustion leaving the gas outlet through the economizer and air heater in parallel, and during the burning of either of said fuels bypassing a regulable portion of the air to be heated in said air heater around part of the heating surface therein.

8. In a fluid heater having a heating gas outlet, conduit means having laterally adjacent upright portions arranged to receive heating gas discharged from said outlet, a plurality of heat exchangers each for heating a different fluid arranged in sequence within said conduit means portions for flow of said heating gas through said heat exchangers in series in contraflow relation to the fluids heated therein, and means for directing heating gas flow from said outlet through said heat exchangers in parallel while maintaining the direction of gas flow through each in the same direction as for gas flow in series through said plurality, the extent of heat exchanger surface contacted by said heating gas being the same for both of said conditions of flow.

9. In a fluid heater having a heating gas outlet, a pair of laterally spaced heat exchangers, a main conduit connecting said heat exchangers and gas outlet for gas flow through said heat exchangers, a bypass conduit arranged to connect the gas inlet end of one heat exchanger to the gas inlet end of the other heat exchanger, a second bypass conduit arranged to connect the gas outlet end of said one heat exchanger to the gas outlet end of said other heat exchanger, and dampers positioned in said main and bypass conduits and operable to provide a heating gas flow through both of said heat exchangers in series or in parallel, said bypass conduits having portions thereof in the space defined by the adjacent sides of said heat exchangers.

10. In a fluid heater having a heating gas outlet, a pair of laterally spaced heat exchangers, a main conduit connecting said heat exchangers and gas outlet for gas flow in one direction through one of said heat exchangers and for gas flow in the opposite direction through the other of said heat exchangers, a bypass conduit arranged to connect the gas inlet end of said one heat exchanger to the gas inlet end of said other heat exchanger, a second bypass conduit arranged to connect the gas outlet end of said one heat exchanger to the gas outlet end of said other heat exchanger, and dampers positioned in said main and bypass conduits and operable to provide a heating gas flow through both of said heat exchangers in series or in parallel, said bypass conduits having portions thereof in the space between said heat exchangers.

11. In a fluid heater having a heating gas outlet, a pair of laterally spaced heat exchangers, a main conduit means connecting said heat exchangers and gas outlet for downward gas flow through one of said heat exchangers and for upward gas flow through the other of said heat exchangers, a bypass conduit means arranged to connect the gas inlet end of said one heat exchanger to the gas inlet end of said other heat exchanger, a second bypass conduit means arranged to connect the gas outlet end of said one heat exchanger to the gas outlet end of said other heat exchanger, both of said bypass conduit means having portions thereof in the space between said heat exchangers, one of said bypass conduit means comprising separate conduit portions arranged at opposite sides of the other of said bypass conduit means, and dampers positioned in said main and bypass conduit means to provide heating gas flow through both of said heat exchangers in series or in parallel.

CLYDE B. BAVER.

REFERENCES CITED

The following references are of record in the file of this patent:

UNITED STATES PATENTS

| Number | Name | Date |
|---|---|---|
| 1,927,215 | Peebles | Sept. 19, 1933 |
| 2,131,058 | Lucke | Sept. 27, 1938 |
| 2,392,325 | Kuhner | Jan. 8, 1946 |

FOREIGN PATENTS

| Number | Country | Date |
|---|---|---|
| 526,173 | German | June 3, 1931 |
| 455,104 | German | Jan. 24, 1928 |
| 94,790 | Austrian | Nov. 10, 1923 |
| 454,408 | German | Jan. 21, 1926 |